US 012122366B2

(12) United States Patent
Okano

(10) Patent No.: US 12,122,366 B2
(45) Date of Patent: Oct. 22, 2024

(54) VEHICLE TRAVEL CONTROL DEVICE HAVING EMERGENCY BRAKING CONTROL

(71) Applicant: SUBARU CORPORATION, Tokyo (JP)

(72) Inventor: Masashi Okano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 267 days.

(21) Appl. No.: 17/407,975

(22) Filed: Aug. 20, 2021

(65) Prior Publication Data

US 2022/0063604 A1 Mar. 3, 2022

(30) Foreign Application Priority Data

Aug. 25, 2020 (JP) ................................ 2020-141550

(51) Int. Cl.
*B60W 30/095* (2012.01)
*B60W 10/18* (2012.01)
(Continued)

(52) U.S. Cl.
CPC ............ *B60W 30/09* (2013.01); *B60W 10/18* (2013.01); *B60W 30/0956* (2013.01);
(Continued)

(58) Field of Classification Search
CPC .. B60W 30/09; B60W 10/18; B60W 30/0956; B60W 30/146; B60W 40/02;
(Continued)

(56) References Cited

U.S. PATENT DOCUMENTS 9,896,097 B2* 2/2018 Ohmura ............ B60W 30/0953
2004/0090320 A1* 5/2004 Suzuki ..................... B60T 7/22
701/1

(Continued)

FOREIGN PATENT DOCUMENTS

JP 2008-243065 A 10/2008
JP 2018-147111 A 9/2018
(Continued)

OTHER PUBLICATIONS

Notice of Reasons for Refusal received in corresponding Japanese Patent Application No. 2020-141550 on Mar. 12, 2024.

*Primary Examiner* — Daniel M. Robert
(74) *Attorney, Agent, or Firm* — Rimon P.C.

(57) ABSTRACT

A travel control device includes a travel environment recognizer recognizing travel environment information around a vehicle, an obstacle recognizer recognizing an obstacle possibly colliding with the vehicle, and a travel controller performing emergency braking when a first parameter becomes a first threshold value or smaller and causing the vehicle to start moving again when a second parameter reaches a second threshold value or larger. The obstacle recognizer recognizes a group of moving objects expressing similar behaviors based on the travel environment information, and recognizes the moving-object group as an obstacle if located closer to the vehicle than other objects. The travel controller calculates an expectation value based on each moving-object's behavior when the vehicle makes an emergency stop, and allows the vehicle to start moving again when the expectation value reaches a threshold value or larger even if the second parameter is smaller than the second threshold value.

15 Claims, 10 Drawing Sheets

(51) Int. Cl.
  *B60W 30/09* (2012.01)
  *B60W 30/14* (2006.01)
  *B60W 40/02* (2006.01)
  *G06V 20/58* (2022.01)

(52) U.S. Cl.
  CPC .......... *B60W 30/146* (2013.01); *B60W 40/02* (2013.01); *G06V 20/58* (2022.01); *B60W 2554/4041* (2020.02); *B60W 2554/4046* (2020.02); *B60W 2554/80* (2020.02)

(58) Field of Classification Search
  CPC . B60W 2554/4041; B60W 2554/4046; B60W 2554/80; B60W 2554/4029; B60W 30/17; B60W 60/00276; B60W 30/18018; G06V 20/58; G06V 20/64
  See application file for complete search history.

(56) References Cited

U.S. PATENT DOCUMENTS

| | | | | |
|---|---|---|---|---|
| 2015/0166062 | A1* | 6/2015 | Johnson | G08G 1/167 |
| | | | | 701/41 |
| 2016/0272215 | A1* | 9/2016 | Laine | G06V 20/597 |
| 2018/0174465 | A1* | 6/2018 | Ikedo | B60T 7/22 |
| 2018/0330617 | A1* | 11/2018 | Wei | B60W 30/18159 |
| 2018/0345922 | A1* | 12/2018 | Prasad | B60T 7/22 |
| 2019/0061749 | A1* | 2/2019 | Fukumoto | G06V 20/58 |
| 2019/0146519 | A1* | 5/2019 | Miura | G06V 40/103 |
| | | | | 701/28 |
| 2019/0347492 | A1* | 11/2019 | Morimura | B60W 40/04 |
| 2020/0001779 | A1* | 1/2020 | Alexander | G06V 20/584 |
| 2020/0105141 | A1 | 4/2020 | Ikeda et al. | |
| 2020/0231144 | A1* | 7/2020 | Ueda | B60T 7/12 |
| 2020/0234572 | A1* | 7/2020 | Karaoguz | G08G 1/015 |
| 2020/0298884 | A1* | 9/2020 | Goto | B60W 30/18159 |
| 2021/0039613 | A1* | 2/2021 | Kakeshita | B60T 7/122 |
| 2021/0146955 | A1* | 5/2021 | Yasui | B60W 50/0097 |
| 2021/0276572 | A1* | 9/2021 | Du | B60W 40/04 |
| 2021/0300359 | A1* | 9/2021 | McGill | G08G 1/096741 |

FOREIGN PATENT DOCUMENTS

| | | |
|---|---|---|
| JP | 2019-172113 A | 10/2019 |
| JP | 2020-052721 A | 4/2020 |

* cited by examiner

VEHICLE TRAVEL CONTROL DEVICE HAVING EMERGENCY BRAKING CONTROL

CROSS-REFERENCE TO RELATED APPLICATIONS

The present application claims priority from Japanese Patent Application No. 2020-141550 filed on Aug. 25, 2020, the entire contents of which are hereby incorporated by reference.

BACKGROUND

The disclosure relates to vehicle travel control devices equipped with emergency braking control functions for obstacles.

In recent years, vehicles, such as automobiles, are equipped with travel control devices for assisting drivers in driving to reduce the load of driving for the drivers and to achieve increased safety. With respect to a travel control device of this kind, there have been developed various technologies (e.g., Japanese Unexamined Patent Application Publication No. 2019-172113) regarding a travel control mode involving performing steering assist control and acceleration-deceleration control assuming that the main driving operation is performed by the driver and a travel control mode (i.e., so-called automated driving mode) in which the vehicle travels automatically without the driving operation by the driver.

Travel control by the travel control device is basically realized with the device having, for example, an adaptive cruise control (ACC) function and an active lane keep centering (ALKC) control function. By performing such travel control, the vehicle can travel automatically along a travel lane while maintaining a certain distance from a vehicle ahead.

Furthermore, when a travel environment recognizer using an autonomous sensor, such as either one of a camera and a laser radar, performs cut-in control with respect to the ACC and recognizes an obstacle, such as either one of a vehicle and a pedestrian, in front of a subject vehicle, autonomous emergency braking (AEB) control is performed for the nearby obstacle, so that the subject vehicle makes an emergency stop before the obstacle. Moreover, with regard to a vehicle equipped with this AEB control function, if the obstacle moves away from the location in front of the subject vehicle or moves away from the subject vehicle by a predetermined safe distance after the subject vehicle makes the emergency stop, the subject vehicle can start moving again automatically.

SUMMARY

An aspect of the disclosure provides a vehicle travel control device to be applied to a vehicle, the vehicle travel control device. The vehicle travel control device includes a travel environment recognizer, an obstacle recognizer, and a travel controller. The travel environment recognizer is configured to recognize travel environment information including road information and traffic information around a vehicle. The obstacle recognizer is configured to recognize an obstacle having a possibility of colliding with the vehicle. The obstacle is included in three-dimensional objects present in front of the vehicle and recognized as the travel environment information. The travel controller is configured to perform emergency braking for avoiding a collision with the obstacle when a first parameter indicating a relative relationship between the vehicle and the obstacle becomes smaller than or equal to a first set threshold value, and cause the vehicle to start moving again when a second parameter becomes larger than or equal to a second set threshold value. The second parameter indicates a relative relationship between the vehicle and the obstacle after the vehicle is stopped in accordance with the emergency braking. The obstacle recognizer is configured to recognize, as a moving-object group, a group of moving objects expressing preset similar behavior patterns among the three-dimensional objects recognized in front of the vehicle based on the travel environment information, and recognize the moving-object group as an obstacle if the moving-object group is located at a position closer to the vehicle than other three-dimensional objects than the moving-object group among the three-dimensional objects. The travel controller is configured to calculate an expectation value based on at least a behavior of each moving object constituting the moving-object group when the vehicle is stopped in accordance with the emergency braking for the moving-object group as the obstacle, and allow the vehicle to start moving again when the expectation value becomes larger than or equal to a set threshold value even if the second parameter is smaller than the second set threshold value.

An aspect of the disclosure provides a vehicle travel control device to be applied to a vehicle. The vehicle travel control device includes circuitry. The circuitry is configured to recognize travel environment information including road information and traffic information around a vehicle. The circuitry is configured to recognize an obstacle having a possibility of colliding with the vehicle. The obstacle is included in three-dimensional objects present in front of the vehicle and recognized as the travel environment information. The circuitry is configured to perform emergency braking for avoiding a collision with the obstacle when a first parameter indicating a relative relationship between the vehicle and the obstacle becomes smaller than or equal to a first set threshold value, and cause the vehicle to start moving again when a second parameter becomes larger than or equal to a second set threshold value. The second parameter indicates a relative relationship between the vehicle and the obstacle after the vehicle is stopped in accordance with the emergency braking. The circuitry is configured to recognize, as a moving-object group, a group of moving objects expressing preset similar behavior patterns among the three-dimensional objects recognized in front of the vehicle based on the travel environment information, and recognize the moving-object group as an obstacle if the moving-object group is located at a position closer to the vehicle than other three-dimensional objects than the moving-object group among the three-dimensional objects. The circuitry is configured to calculate an expectation value based on at least a behavior of each moving object constituting the moving-object group when the vehicle is stopped in accordance with the emergency braking for the moving-object group as the obstacle, and allow the vehicle to start moving again when the expectation value becomes larger than or equal to a set threshold value even if the second parameter is smaller than the second set threshold value.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

For example, when a subject vehicle travels through a congested downtown area, a plurality of pedestrians may be successively recognized in front of the subject vehicle. In such a case, the pedestrians (i.e., obstacles) for which AEB control is to be performed may sequentially change, thus causing the subject vehicle to be maintained in a stopped state by the AEB control. This may possibly make it difficult for the subject vehicle to travel forward.

It is desirable to provide a vehicle travel control device that can ensure appropriate traveling of a subject vehicle even when a plurality of pedestrians are successively recognized in front of the subject vehicle, as in a congested downtown area.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
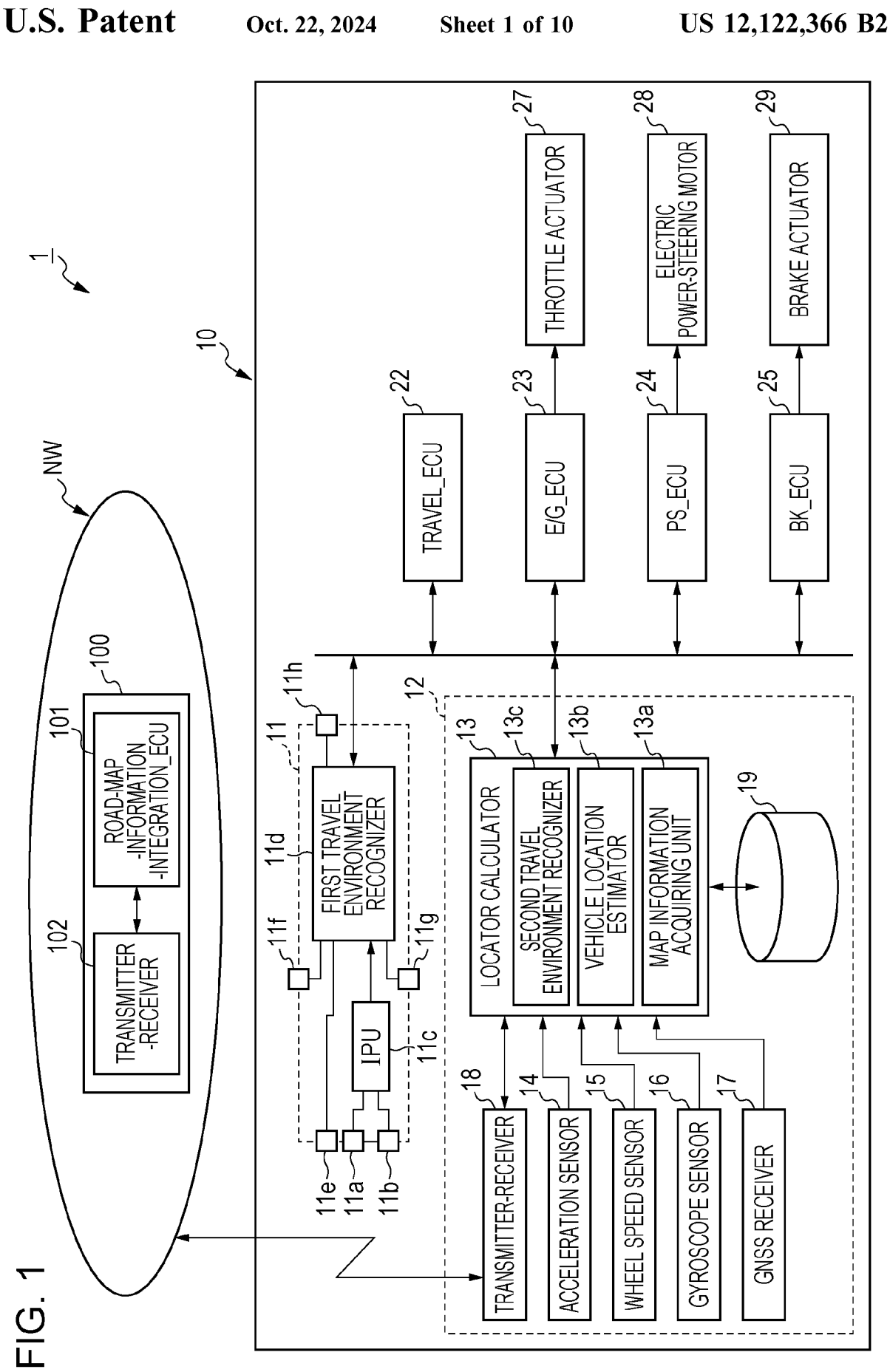
FIG. 1 illustrates the overall configuration of a travel control system.
Figure 2:
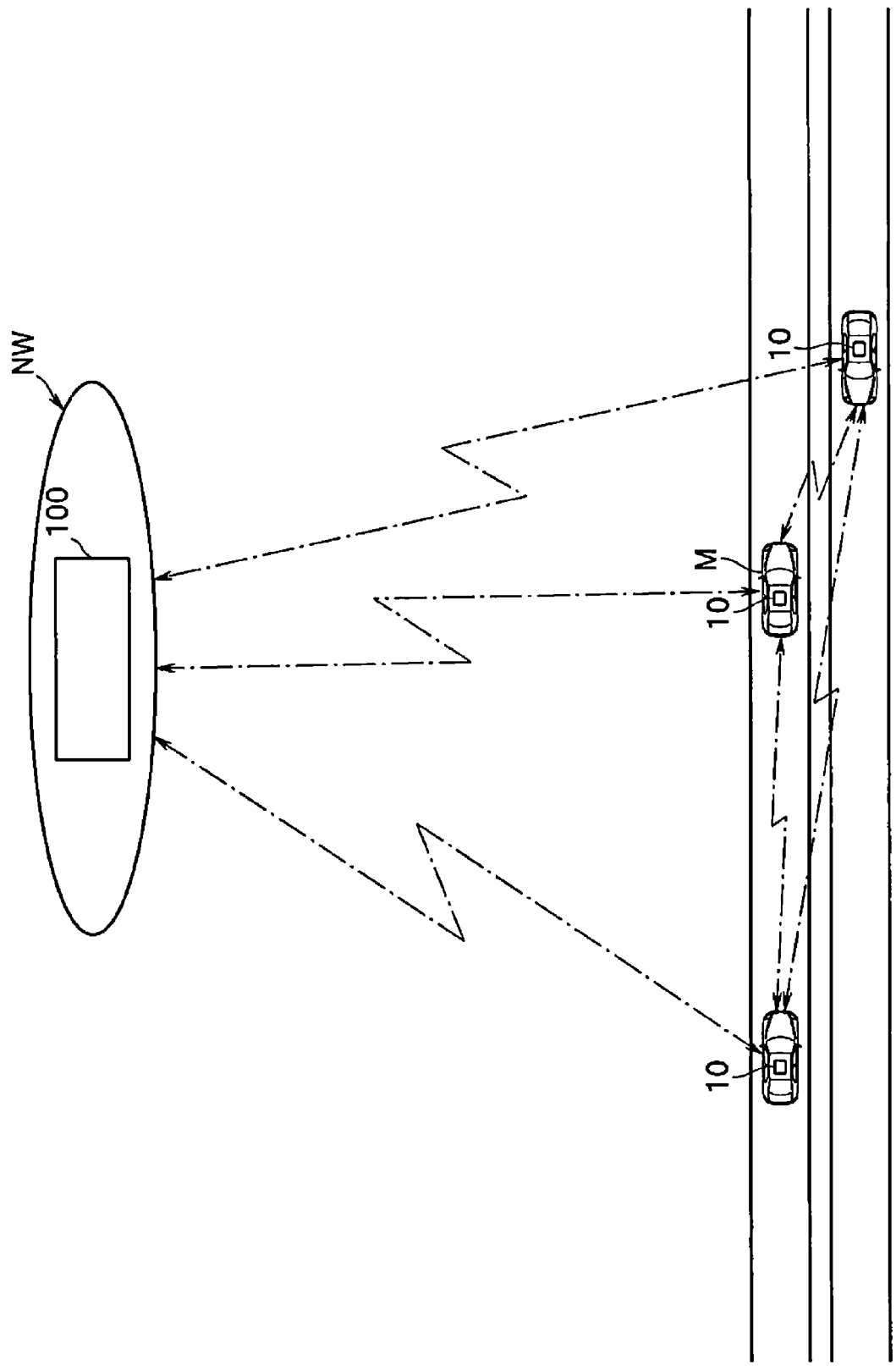
FIG. 2 illustrates road-to-vehicle communication and vehicle-to-vehicle communication.

FIG. 1 illustrates the overall configuration of a travel control system. As illustrated in FIG. 1 and FIG. 2, a travel control system 1 according to this embodiment has travel control devices 10 individually installed in a plurality of vehicles, and a plurality of control devices 100 provided in a network environment NW to which the plurality of travel control devices 10 are coupled by wireless communication. Each control device 100 is provided as, for example, a server device in a cloud-computing-based or edge-computing-based network environment or in a road-incidental-facility-network-based network environment.

Each control device 100 successively integrates and updates road map information transmitted from the travel control devices 10 of the individual vehicles, and transmits the updated road map information to the vehicles. In order to achieve this, the control device 100 has a road-map-information-integration ECU 101 and a transmitter-receiver 102.

The road-map-information-integration_ECU 101 integrates the road map information collected from the plurality of vehicles via the transmitter-receiver 102, and successively updates the road map information surrounding the vehicles on the road. The road map information has, for example, a dynamic map and has four layers of information, namely, static information and semi-static information mainly constituting road information, and semi-dynamic information and dynamic information mainly constituting traffic information.

The static information is constituted of information that demands an update at least every month, such as information about roads and structures on roads, lane information, road surface information, and permanent regulation information.

The semi-static information is constituted of information that demands an update at least every hour, such as information about a traffic regulation caused by road construction and an event, wide-area weather information, and a traffic-jam prediction.

The semi-dynamic information is constituted of information that demands an update at least every minute, such as information about an actual traffic-jam situation and a travel regulation at an observation time point, information about a temporary traffic obstacle, such as a fallen object and an obstacle, information about an actual accident, and small-area weather information.

The dynamic information is constituted of information that demands an update in units of seconds, such as information transmitted and exchanged between moving objects, information about currently-indicated traffic lights, information about pedestrians and two-wheeled vehicles at intersections, and information about vehicles traveling into intersections.

Such road map information is maintained and updated in cycles until subsequent information is received from each vehicle, and the updated road map information is appropriately transmitted to each vehicle via the transmitter-receiver 102.

Each travel control device 10 has a travel-environment recognition unit 11 and a locator unit 12 as units for recognizing the travel environment outside the vehicle. Furthermore, the travel control device 10 includes a travel control unit (referred to as "travel_ECU" hereinafter) 22, an engine control unit (referred to as "E/G_ECU" hereinafter) 23, a power-steering control unit (referred to as "PS_ECU" hereinafter) 24, and a brake control unit (referred to as "BK_ECU" hereinafter) 25. These control units 22 to 25 are coupled to the travel-environment recognition unit 11 and the locator unit 12 via an in-vehicle communication line, such as a controller area network (CAN).

The travel-environment recognition unit 11 is fixed to, for example, an upper central area at the front of the vehicle cabin. The travel-environment recognition unit 11 has a vehicle-mounted camera (i.e., stereo camera) constituted of a main camera 11a and a sub camera 11b, an image processing unit (IPU) 11c, and a first travel environment recognizer 11d.

The main camera 11a and the sub camera 11b serve as an autonomous sensor that detects the real space surrounding a subject vehicle M, are disposed at, for example, bilaterally-symmetric locations with respect to the center in the vehicle width direction, and capture stereo images of the front environment of the subject vehicle M from different visual points.

The IPU 11c performs predetermined image processing on the image information of the front travel environment of the subject vehicle M captured by the cameras 11a and 11b, so as to generate front-travel-environment image information (distance image information) including distance information determined from the amount of positional displacement of a corresponding target.

Based on, for example, the distance image information received from the IPU 11c, the first travel environment recognizer 11d determines lane boundary lines defining roads surrounding the subject vehicle M.

Furthermore, the first travel environment recognizer 11d determines the road curvature [1/m] of left and right boundary lines for the travel path (travel lane) of the subject vehicle M, as well as the width (vehicle width) between the left and right boundary lines. Although there are various known methods for determining this road curvature and the vehicle width, for example, the first travel environment recognizer 11d recognizes the left and right boundary lines by performing binarization processing in accordance with a luminance difference based on the front-travel-environment image information, and determines the curvature of the left and right boundary lines as the road curvature for every predetermined segment by using, for example, a curve approximation formula based on the least squares method.

Moreover, the first travel environment recognizer 11d performs predetermined pattern matching on the distance image information so as to recognize three-dimensional objects, such as a guardrail and a curb extending along the road and a pedestrian, two-wheeled vehicle, and vehicle other than a two-wheeled vehicle existing on the road around the subject vehicle M. In the recognition of each three-dimensional object by the first travel environment recognizer 11d, for example, the type of the three-dimensional object, the distance to the three-dimensional object, the speed of the three-dimensional object, and the relative speed between the three-dimensional object and the subject vehicle M are recognized. Of such three-dimensional objects recognized in this manner, a three-dimensional object having speed is categorized as a moving object.

Furthermore, the first travel environment recognizer 11d is coupled to, for example, radar devices 11e to 11h as autonomous sensors for detecting the front side, the left and right sides, and the rear side of the subject vehicle M. The radar devices 11e to 11h are each constituted of any one of a millimeter wave radar, a laser radar, and a Lidar (light detection and ranging). Each of the radar devices 11e to 11h analyzes a reflection wave of either one of a horizontally-emitted radio wave and a laser beam, so as to detect a three-dimensional object existing around the subject vehicle M. Three-dimensional-object information detected by each of the radar devices 11e to 11h is input to the first travel environment recognizer 11d. The first travel environment recognizer 11d fuses the three-dimensional-object information detected by the radar devices 11e to 11h with information recognized based on the stereo camera, so as to perform three-dimensional-object recognition entirely around the subject vehicle M. Accordingly, in addition to a vehicle traveling ahead of the subject vehicle M, the first travel environment recognizer 11d is capable of recognizing a vehicle traveling parallel to the subject vehicle M, as well as a vehicle traveling behind the subject vehicle M.

The radar device 11e is provided at the front side of the subject vehicle M so that the first travel environment recognizer 11d can accurately recognize a three-dimensional object that is located immediately in front of the subject vehicle M and that is difficult to capture with the stereo camera. That is, with the radar device 11e being provided at the front side of the subject vehicle M, the first travel environment recognizer 11d can recognize a three-dimensional object blocked by, for example, the hood of the subject vehicle M and located at a blind spot of the stereo camera.

Accordingly, in this embodiment, the first travel environment recognizer 11d recognizes the first travel environment information containing road information surrounding the subject vehicle M, including the travel path thereof, and traffic information about a running vehicle and a parked vehicle existing on the road. That is, the first travel environment recognizer 11d functions as a travel environment recognizer (first travel environment recognizer) that recognizes first travel environment information containing road information and traffic information around a subject vehicle based on information acquired by the autonomous sensor.

As an alternative to this exemplary embodiment in which front travel environment of the subject vehicle M is recognized based on information from the stereo camera and lateral and rear travel environments are recognized based on information from the radar devices, the autonomous sensors are not limited thereto. For example, the autonomous sensor used for detecting the front travel environment of the subject vehicle M may be a combination of a monocular camera and a radar device, or the autonomous sensors used for detecting the lateral and rear sides of the subject vehicle M may each be either one of a stereo camera and a monocular camera.

The locator unit 12 estimates the vehicle location on the road map and has a locator calculator 13 that estimates the vehicle location. The input side of the locator calculator 13 is coupled to various sensors to be used for estimating the location (vehicle location) of the subject vehicle M. Such various sensors include a front-rear acceleration sensor 14 that detects the front-rear acceleration of the subject vehicle M, a wheel speed sensor 15 that detects the rotation speed of the front, rear, left, and right wheels, a gyroscope sensor 16 that detects either one of an angular velocity and angular acceleration of the subject vehicle M, and a global navigation satellite system (GNSS) receiver 17 that receives positioning signals transmitted from a plurality of positioning satellites. The locator calculator 13 is also coupled to a transmitter-receiver 18 for exchanging information (i.e., for performing road-to-vehicle communication: see single-dot chain lines in FIG. 2) with the control device 100 and also for exchanging information (i.e., for performing vehicle-to-vehicle communication: see double-dot chain lines in FIG. 2) with other vehicles.

The locator calculator 13 is coupled to a high-definition road map database 19. The high-definition road map database 19 is a mass storage medium, such as a hard disk drive (HDD), and stores high-definition road map information (dynamic map). As information to be used when travel control is to be performed on the subject vehicle M, for example, the high-definition road map information is similar to the road map information to be successively updated in the aforementioned road-map-information-integration_ECU 101. That is, the high-definition road map information has four layers of information, namely, static information and semi-static information mainly constituting road information, and semi-dynamic information and dynamic information mainly constituting traffic information.

The locator calculator 13 includes a map information acquiring unit 13a, a vehicle location estimator 13b, and a second travel environment recognizer 13c.

For example, based on a destination set by the driver for automated driving, the map information acquiring unit 13a acquires route map information from the current location to the destination from the map information stored in the high-definition road map database 19.

Furthermore, the map information acquiring unit 13a transmits the acquired route map information (i.e., lane data on the route map) to the vehicle location estimator 13b. The vehicle location estimator 13b acquires the positional coordinates of the subject vehicle M based on the positioning signals received by the GNSS receiver 17. Moreover, the vehicle location estimator 13b map-matches the acquired positional coordinates on the route map information to estimate the vehicle location on the road map, recognizes the left and right lane boundary lines serving as boundaries for the travel path (travel lane) of the subject vehicle M, and acquires the road curvature at the center of the travel lane stored in the road map data.

Furthermore, in an environment, such as inside a tunnel, where it is difficult to receive an effective positioning signal from a positioning satellite due to low reception sensitivity of the GNSS receiver 17, the vehicle location estimator 13b switches to an autonomous navigation mode involving estimating the vehicle location based on the vehicle speed determined based on the wheel speed detected by the wheel speed sensor 15, the angular velocity detected by the gyroscope sensor 16, and the front-rear acceleration detected by the front-rear acceleration sensor 14, so as to estimate the vehicle location on the road map.

Moreover, when the vehicle location estimator 13b estimates the vehicle location on the road map based on either one of the positioning signal received by the GNSS receiver 17 and the information detected by the gyroscope sensor 16 and so on, the vehicle location estimator 13b determines the road type of the travel path on which the subject vehicle M is currently traveling based on the estimated vehicle location on the road map.

The second travel environment recognizer 13c uses the road map information acquired as a result of the external communication (i.e., road-to-vehicle communication and vehicle-to-vehicle communication) via the transmitter-receiver 18, so as to update the road map information stored in the high-definition road map database 19 to the latest status. In addition to the static information, this update is performed for the semi-static information, the semi-dynamic information, and the dynamic information. Accordingly, the road map information contains road information and traffic information acquired as a result of communication with the outside, and information about a moving object, such as a vehicle, traveling on the road is updated substantially in real time.

The second travel environment recognizer 13c verifies the road map information based on the travel environment information recognized by the travel-environment recognition unit 11, and updates the road map information stored in the high-definition road map database 19 to the latest status. In addition to the static information, this update is performed for the semi-static information, the semi-dynamic information, and the dynamic information. Accordingly, information about a moving object, such as a vehicle, traveling on the road and recognized by the travel-environment recognition unit 11 is updated in real time.

The road map information updated in this manner is transmitted to the control device 100 and to a vehicle in the vicinity of the subject vehicle M by road-to-vehicle communication and vehicle-to-vehicle communication via the transmitter-receiver 18.

Furthermore, in the updated road map information, the second travel environment recognizer 13c recognizes road map information in a set range centered on the vehicle location estimated by the vehicle location estimator 13b as second travel environment information. The range of the second travel environment information to be recognized by the second travel environment recognizer 13c is larger than that of the first travel environment information to be recognized by the first travel environment recognizer 11d, such that, for example, road map information of a 1 km-radius range centered on the vehicle location is recognized as the second travel environment information.

Accordingly, in this embodiment, the second travel environment recognizer 13c functions as a travel environment recognizer (second travel environment recognizer) that recognizes second travel environment information including road information and traffic information surrounding the subject vehicle M acquired as a result of communication with the outside of the subject vehicle M.

The first travel environment information recognized by the first travel environment recognizer 11d of the travel-environment recognition unit 11 and the second travel environment information recognized by the second travel environment recognizer 13c of the locator unit 12 are read by the travel_ECU 22. Furthermore, the input side of the travel_ECU 22 is coupled to various switches and sensors. Such various switches and sensors include a mode switch to be used by the driver for switching the automated driving (travel control) between on and off modes, a steering torque sensor that detects steering torque as an amount of driving operation performed by the driver, a brake sensor that detects an amount by which the brake pedal is pressed as an amount of driving operation performed by the driver, an accelerator sensor that detects an amount by which the accelerator pedal is pressed as an amount of driving operation performed by the driver, and a yaw rate sensor that detects a yaw rate acting on the subject vehicle M.

The travel_ECU 22 has driving modes set therein. The set driving modes include a manual driving mode, a first travel control mode and a second travel control mode for performing travel control, and an evacuation mode. These driving modes are switchable in a selectable manner by the travel_ECU 22 based on, for example, the status of an operation performed on the mode switch.

The manual driving mode involves steering performed by the driver. For example, in the manual driving mode, the subject vehicle M travels in accordance with a driving operation, such as a steering operation, an accelerator operation, and a braking operation by the driver.

Likewise, the first travel control mode involves steering performed by the driver. That is, the first travel control mode is a so-called semi-automatic driving mode that involves causing the subject vehicle M to travel along a target travel path by causing, for example, the E/G_ECU 23, the PS_ECU 24, and the BK_ECU 25 to perform control by mainly combining adaptive cruise control (ACC), active lane keep centering (ALKC) control, and active lane keep bouncing control, where appropriate, while reflecting a driving operation performed by the driver.

The second travel control mode is an automatic driving mode that does not involve a steering operation, an accelerator operation, and a braking operation performed by the driver, but involves causing the subject vehicle M to travel in accordance with a target route (route map information) by causing, for example, the E/G_ECU 23, the PS_ECU 24, and the BK_ECU 25 to perform control by mainly combining adaptive cruise control, active lane keep centering control, and active lane keep bouncing control, where appropriate.

The evacuation mode involves automatically stopping the subject vehicle M on a roadside in a case where, for example, the subject vehicle M is not able to continue traveling in the second travel control mode and the driver is not able to take over the driving operation (i.e., in a case where a transition to either one of the manual driving mode and the first travel control mode is not possible).

Furthermore, in each of the aforementioned driving modes, the travel_ECU 22 performs collision avoidance control, where appropriate, for an obstacle, such as a pedestrian, having a high possibility of colliding with the subject vehicle M. This collision avoidance control involves performing emergency braking for an obstacle and is to be executed, where appropriate, as cut-in control during the ACC. For example, when the travel_ECU 22 recognizes an obstacle in front of the subject vehicle M, the travel_ECU 22 sets a target stopping position for urgently stopping the subject vehicle M for the obstacle. This target stopping position is set to a position offset from the obstacle toward the subject vehicle M by a predetermined target objective distance Lt (e.g., 30 cm from the obstacle toward the subject vehicle M). Furthermore, for example, the travel_ECU 22 calculates a predicted time to collision TTC with respect to the obstacle as a first parameter. For example, this predicted time to collision TTC is calculated as a value obtained by dividing a relative distance between the subject vehicle M and the obstacle (i.e., a distance from the subject vehicle M to the target stopping position) by a relative speed between the subject vehicle M and the obstacle. Then, when the calculated predicted time to collision TTC becomes smaller than or equal to a set threshold value Tth (i.e., first set threshold value), the travel_ECU 22 performs emergency braking for the obstacle.

Furthermore, when the subject vehicle M is stopped as a result of the emergency braking for the obstacle, the travel_ECU 22 performs control for causing the subject vehicle M to start moving again. For example, in a case where a relative distance (objective distance) L between the subject vehicle M and the obstacle as a second parameter becomes larger than or equal to a set threshold value Lth (i.e., second set threshold value) as a safe distance after the subject vehicle M is stopped as a result of the emergency braking, the travel_ECU 22 basically causes the subject vehicle M to start moving again. When the obstacle is no longer in front of the subject vehicle M, as in a case where the obstacle crosses in front of the subject vehicle M or the obstacle moves along a side of the subject vehicle M, the travel_ECU 22 calculates, for example, an infinite distance as the objective distance L to the obstacle, and causes the subject vehicle M to start moving again.

As an obstacle for which collision avoidance control (emergency braking) is to be performed, the travel_ECU 22 basically recognizes a single three-dimensional object located closest to the subject vehicle M among three-dimensional objects existing in front of the subject vehicle M. For example, during ACC, if a plurality of pedestrians (i.e., three-dimensional objects) enter an area between the subject vehicle M and a vehicle ahead serving as a control target of the ACC, the travel_ECU 22 recognizes the three-dimensional object located closest to the subject vehicle M as an obstacle among these three-dimensional objects.

However, in a case where a plurality of three-dimensional objects (i.e., moving objects), such as pedestrians, are successively recognized in front of the subject vehicle M, as in a case where the subject vehicle M is traveling through a congested downtown area or on a road near an event site, the travel_ECU 22 performs a grouping process on moving objects that express similar behavior patterns. Then, if the moving-object group having undergone the grouping process is located closest to the front of the subject vehicle M, the travel_ECU 22 recognizes the moving-object group as a single obstacle.

In a case where such a moving-object group is recognized as an obstacle, the travel_ECU 22 calculates an expectation value for causing the subject vehicle M to start moving again from the stopped state caused by the emergency braking based on at least the behavior of each moving object constituting the moving-object group. Then, when the expectation value becomes larger than or equal to a set threshold value, the travel_ECU 22 allows the subject vehicle M to start moving again even if the objective distance L is smaller than the set threshold value Lth. In more detail, for example, when the expectation value becomes larger than or equal to the set threshold value and there is a predetermined moving space formed in the moving-object group, the travel_ECU 22 allows the subject vehicle M to start moving again at a very low speed (e.g., creeping speed or lower). The creeping speed is an idle speed of the subject vehicle M at which the subject vehicle M moves forward or reverse due to creeping with an automatic transmission without the accelerator operation of the subject vehicle M.

Accordingly, in this exemplary embodiment, the travel_ECU 22 functions as an obstacle recognizer and as a travel controller.

The output side of the E/G_ECU 23 is coupled to a throttle actuator 27. The throttle actuator 27 opens and closes a throttle valve of an electronically-controlled throttle provided in the throttle body of the engine, and adjusts the intake air flow by opening and closing the throttle valve in accordance with a driving signal from the E/G_ECU 23, thereby generating a desired engine output.

The output side of the PS_ECU 24 is coupled to an electric power-steering motor 28. The electric power-steering motor 28 applies steering torque to a steering mechanism by using a rotational force of a motor. In automated driving, the electric power-steering motor 28 controls the electric power-steering motor 28 in accordance with a driving signal from the PS_ECU 24, so that active lane keep centering (ALKC) control for maintaining the subject vehicle M on the current travel lane and lane change control (i.e., lane change control for passing control) for moving the subject vehicle M to a neighboring lane are executed.

The output side of the BK_ECU 25 is coupled to a brake actuator 29. The brake actuator 29 adjusts the braking hydraulic pressure to be supplied to a brake wheel cylinder provided in each wheel. When the brake actuator 29 is driven in accordance with a driving signal from the BK_ECU 25, each brake wheel cylinder generates a braking force with respect to the corresponding wheel, thereby forcibly decelerating the subject vehicle M.

Next, obstacle recognition control, emergency braking control for an obstacle, restart control after stopping due to emergency braking, all of which are to be executed by the travel_ECU 22, will be described. These types of control are to be executed when, for example, a driving mode including ACC is selected. For example, each of the aforementioned types of control is to be executed when the second travel control mode (automated driving mode) is selected as the driving mode. Alternatively, these types of control may be executed when the first travel control mode is selected as the driving mode.

Figure 3:
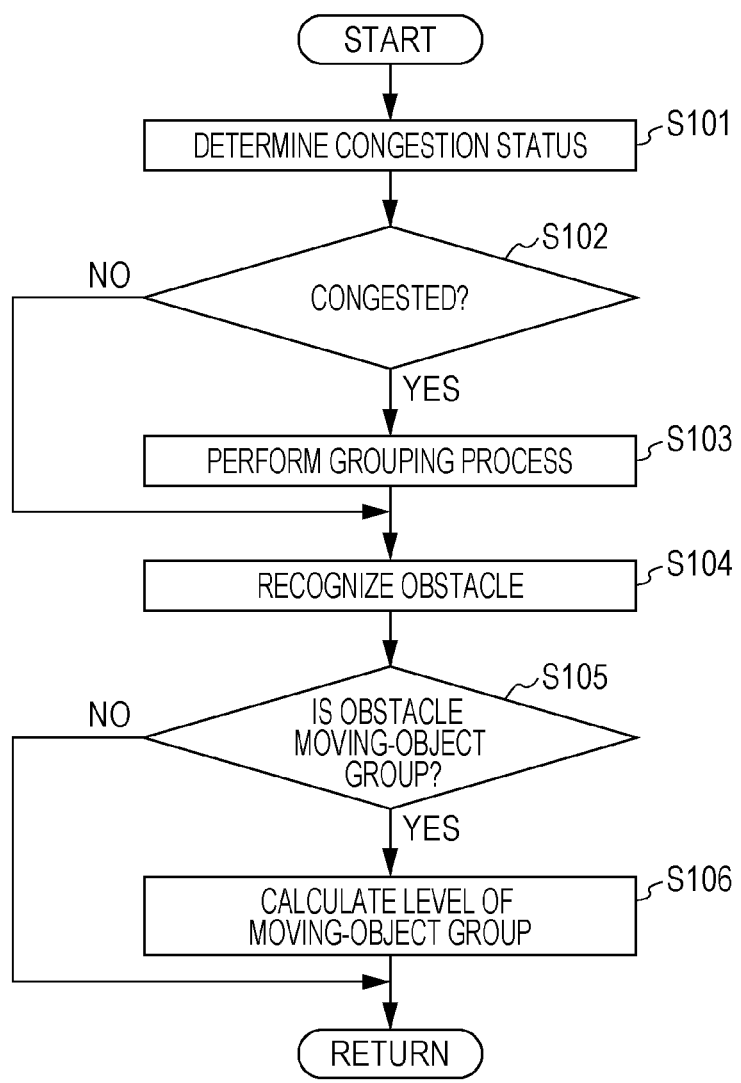
FIG. 3 is a flowchart illustrating an obstacle recognition control routine.

First, the obstacle recognition control to be executed by the travel_ECU 22 will be described with reference to a flowchart of an obstacle recognition control routine illustrated in FIG. 3. This routine is to be executed repeatedly for every set time period.

When the routine starts, the travel_ECU 22 first determines in step S101 the congestion status surrounding the subject vehicle M based on first travel environment information and second travel environment information. For example, in step S101, the travel_ECU 22 counts the number of moving objects, such as pedestrians, located within a set range (e.g., a 100-*m* radius range) centered on the subject vehicle M. Then, if the counted number of moving objects is larger than or equal to a set threshold value, the travel_ECU 22 determines that the area surrounding the subject vehicle M is congested.

Alternatively, the congestion status may be determined based on, for example, event-related traffic regulation information contained in the second travel environment information. As another alternative, for example, the congestion status may be determined based on information from a base station of mobile phones. As a further alternative, the congestion status may be determined collectively in view of at least two pieces of information among the counted number of moving objects, the traffic regulation information, and the information from the base station.

In step S102, the travel_ECU 22 checks whether the area surrounding the subject vehicle M is determined as being congested in step S101.

If the determination result indicates that the area surrounding the subject vehicle M is not congested, the travel_ECU 22 proceeds to step S104 from step S102.

In contrast, if the determination result indicates that the area surrounding the subject vehicle M is congested, the travel_ECU 22 proceeds to step S103 from step S102, and performs a grouping process on the moving objects recognized around the subject vehicle M.

Figure 6:
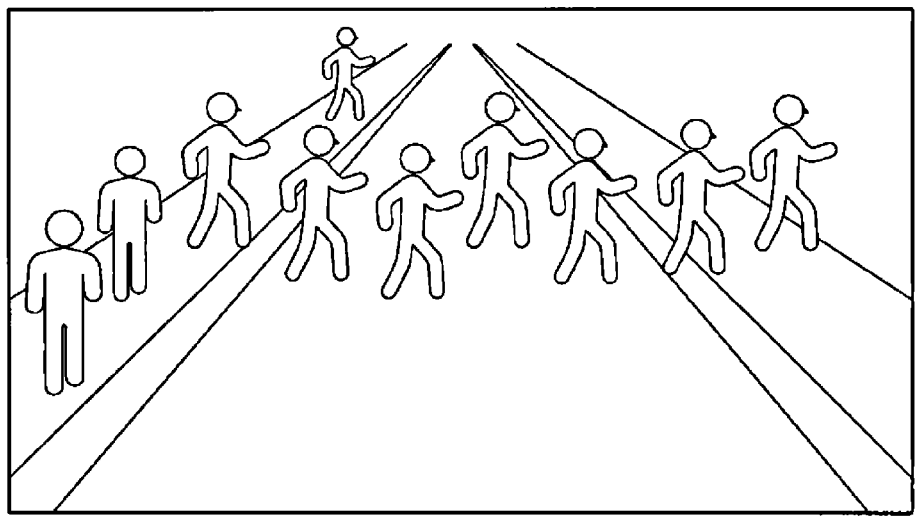
FIG. 6 illustrates an image of moving objects, such as a plurality of pedestrians, crossing in front of a subject vehicle.
Figure 7:
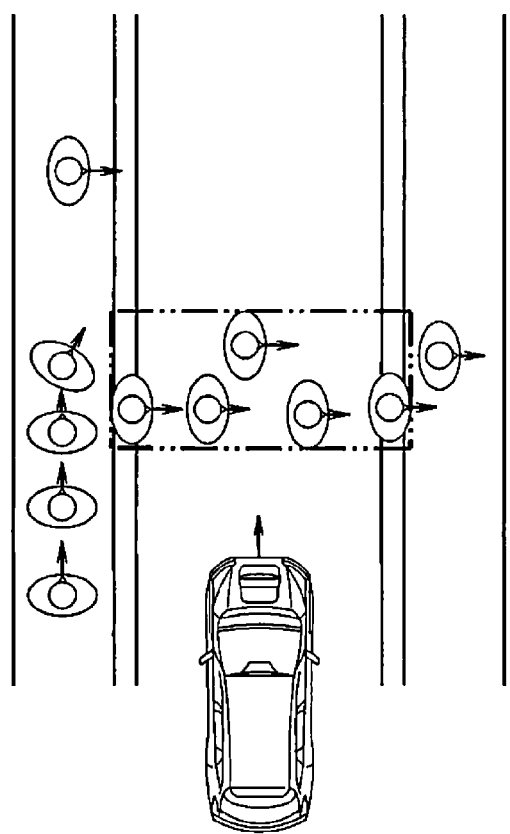
FIG. 7 illustrates a moving-object group constituted of a plurality of pedestrians crossing in front of the subject vehicle.
Figure 11:
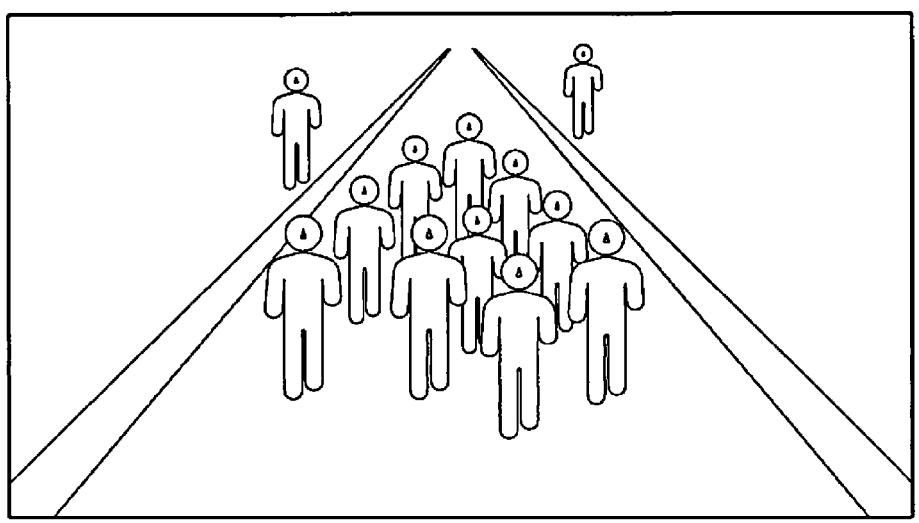
FIG. 11 illustrates a moving-object group constituted of a plurality of pedestrians moving toward the subject vehicle.
Figure 12:
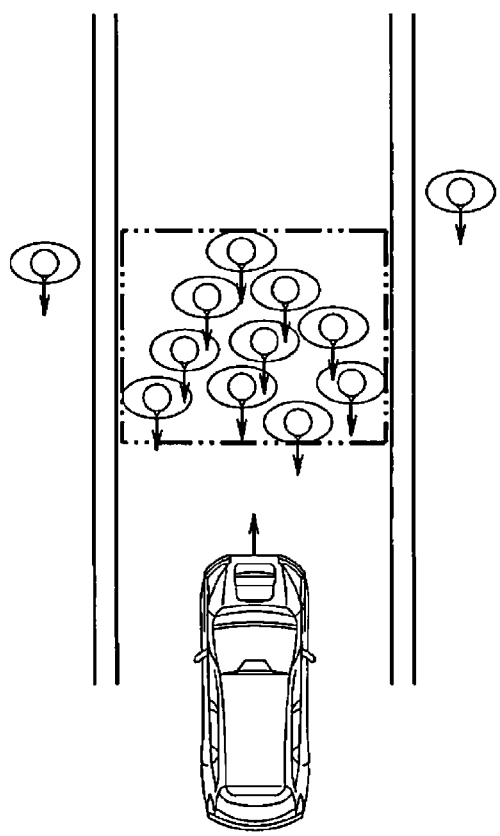
FIG. 12 illustrates an image of moving objects, such as a plurality of pedestrians, moving toward the subject vehicle.

The grouping process is mainly performed when a plurality of moving objects are recognized on a travel path in front of the subject vehicle M (e.g., see FIG. 6 and FIG. 11). In one example, the travel_ECU 22 checks the behavior of each moving object recognized on the travel path in front of the subject vehicle M, and recognizes a group of moving objects expressing preset similar behavior patterns as a moving-object group. In detail, for the moving objects recognized on the travel path in front of the subject vehicle M, for example, the travel_ECU 22 checks whether the distance between neighboring moving objects is within a set distance, whether the moving objects are moving in the same direction within a set angular range, and whether the moving objects are moving at the same speed within a set range. Then, the travel_ECU 22 extracts a plurality of moving objects that satisfy the aforementioned conditions, and recognizes, for example, a minimal region (e.g., minimal rectangular region indicated by a double-dot chain line in FIG. 7 and FIG. 11) surrounding the extracted moving objects as a moving-object group. If the moving-object group has a three-dimensional object that does not satisfy the aforementioned conditions, the three-dimensional object is excluded from the moving-object group and is treated as an independent three-dimensional object.

When the travel_ECU 22 proceeds to step S104 from either one of step S102 and step S103, the travel_ECU 22 recognizes an obstacle in front of the subject vehicle M. In one example, when there are three-dimensional objects on the travel path in front of the subject vehicle M, the travel_ECU 22 recognizes a three-dimensional object located closest to the front of the subject vehicle M as an obstacle that may possibly collide with the subject vehicle M among these three-dimensional objects.

In this obstacle recognition, if a moving-object group is recognized in front of the subject vehicle M, the travel_ECU 22 treats this moving-object group as a single three-dimensional object. In one example, if there are a plurality of three-dimensional objects including the moving-object group in front of the subject vehicle M and the moving-object group is located closest to the front of the subject vehicle M, the travel_ECU 22 recognizes the moving-object group as an obstacle.

When the travel_ECU 22 proceeds to step S105 from step S104, the travel_ECU 22 checks whether the currently-recognized obstacle is a moving-object group.

Then, if the determination result in step S105 indicates that the obstacle is not a moving-object group, the travel_ECU 22 exits the routine.

In contrast, if the determination result in step S105 indicates that the obstacle is a moving-object group, the travel_ECU 22 proceeds to step S106 to calculate the level of the moving-object group, and exits the routine. The level of the moving-object group is collectively calculated based on, for example, the density of the moving-object group, the moving direction of the barycenter of the moving-object group, and the peripheral congestion status.

For example, the travel_ECU 22 divides the number of moving objects constituting the moving-object group by an area by which the moving-object group occupies the road, so as to calculate the density of the moving-object group. Then, the travel_ECU 22 refers to a preset map so as to calculate the level of the moving-object group such that the level increases with increasing density of the moving-object group.

Furthermore, for example, the travel_ECU 22 determines the barycenter of the moving-object group from the distribution of the moving objects in the moving-object group, and also determines the moving direction of the entire moving-object group from the distribution of the individual speeds of the moving objects. Then, if the barycenter of the moving-object group is approaching toward the subject vehicle M, the travel_ECU 22 calculates the level of the moving-object group as a high level, as compared with a case where the barycenter of the moving-object group is moving away from the subject vehicle M.

Furthermore, if the area surrounding the subject vehicle M is congested due to moving objects other than the moving-object group, there is a high possibility that nearby moving objects may join the moving-object group. Thus, the travel_ECU 22 calculates the level of the moving-object group as a high level, as compared with a case where the area surrounding the subject vehicle M is not congested.

Figure 4:
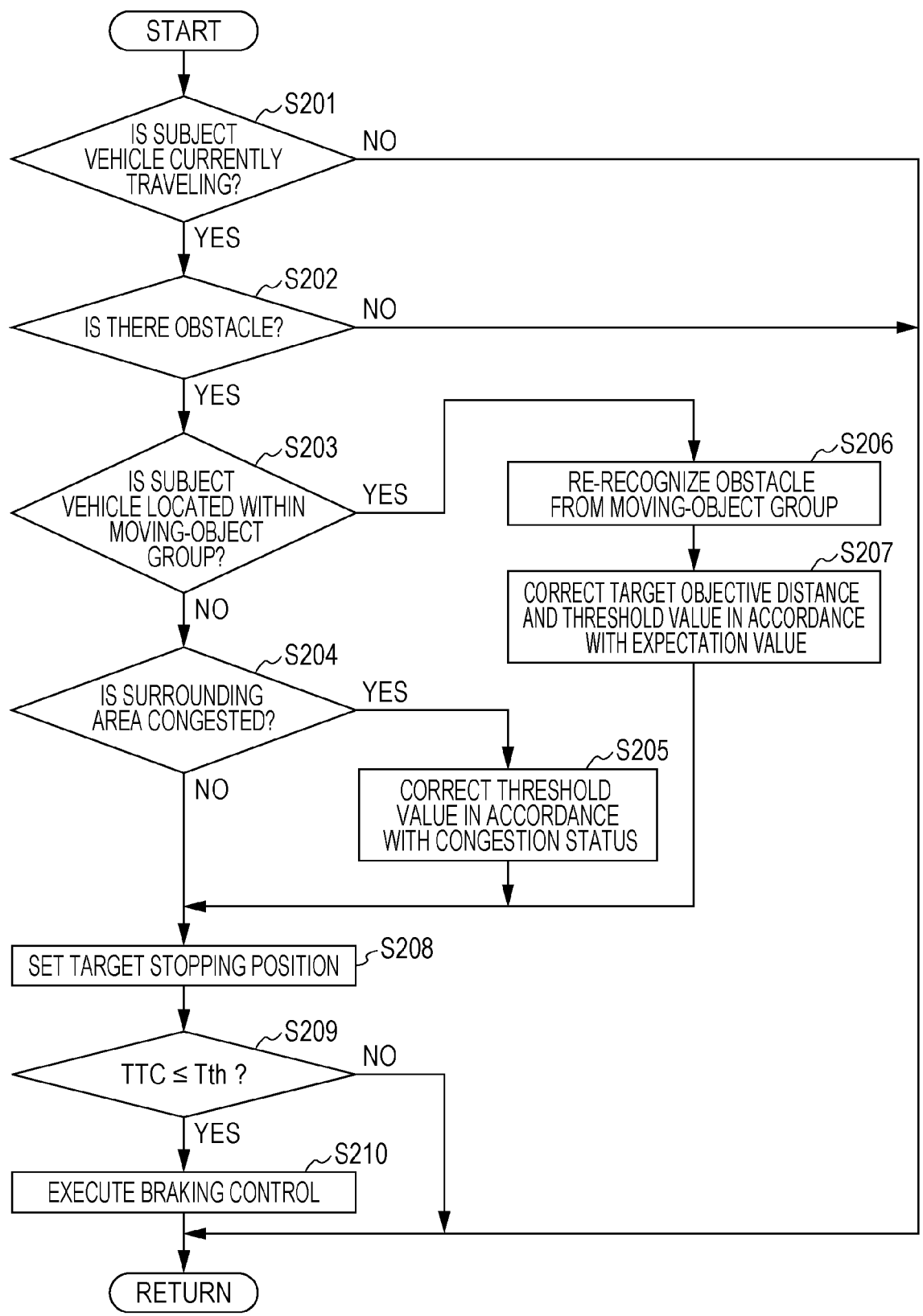
FIG. 4 is a flowchart illustrating an emergency braking control routine performed for an obstacle.

Next, the emergency braking control to be performed for an obstacle will be described with reference to a flowchart of an emergency braking control routine illustrated in FIG. 4. This routine is to be executed repeatedly for every set time period.

When the routine starts, the travel_ECU 22 checks in step S201 whether the subject vehicle M is currently traveling.

If the subject vehicle M is not traveling in step S201, that is, if the subject vehicle M is in a stopped state, the travel_ECU 22 exits the routine.

In contrast, if the subject vehicle M is traveling in step S201, the travel_ECU 22 proceeds to step S202 to check whether there is an obstacle in front of the subject vehicle M.

If the determination result obtained in step S202 indicates that there is no obstacle in front of the subject vehicle M, the travel_ECU 22 exits the routine.

In contrast, if the determination result obtained in step S202 indicates that there is an obstacle in front of the subject vehicle M, the travel_ECU 22 proceeds to step S203 to check whether the currently-recognized obstacle is a moving-object group and the subject vehicle M is located within the moving-object group.

If the determination result obtained in step S203 indicates that the subject vehicle M is not currently located within the moving-object group, the travel_ECU 22 proceeds to step S204 to check whether the determination result obtained in step S101 described above indicates that the area surrounding the subject vehicle M is congested with moving objects, such as pedestrians.

If the determination result obtained in step S204 indicates that the area surrounding the subject vehicle M is not congested, the travel_ECU 22 proceeds to step S208.

In contrast, if the determination result obtained in step S204 indicates that the area surrounding the subject vehicle M is congested, the travel_ECU 22 proceeds to step S205 to correct the set threshold value Tth for the TTC, to be described later, in accordance with the congestion status, and subsequently proceeds to step S208. That is, a possibility in which pedestrians on sidewalks enter the travel path of the subject vehicle M becomes higher as the area surrounding the subject vehicle M becomes more congested due to an increasing number of pedestrians surrounding the subject vehicle M. Thus, the travel_ECU 22 performs the correction to increase the threshold value Tth as the area surrounding the subject vehicle M becomes more congested, so as to advance the timing for executing braking control. Accordingly, braking control in step S210 to be described later is executed at a relatively moderate deceleration rate.

If the determination result obtained in step S203 indicates that the subject vehicle M is currently located within the moving-object group, the travel_ECU 22 proceeds to step S206 to re-recognize an obstacle from within the moving-object group, and subsequently proceeds to step S207. That is, a case where the travel_ECU 22 proceeds from step S203 to step S206 corresponds to a case where the subject vehicle M is traveling through the moving-object group at the lowest vehicle speed in a restart control routine to be described later. In this case, since the objective distance L is "0" in a state where the moving-object group remains to be recognized as an obstacle, the travel_ECU 22 calculates the TTC as "0". Thus, among the moving objects in the moving-object group, the travel_ECU 22 re-recognizes a moving object located closest to the subject vehicle M in front of the subject vehicle M as an obstacle.

Subsequently, in step S207, the travel_ECU 22 corrects the target objective distance relative to the obstacle re-recognized in step S206 and corrects the set threshold value Tth for the TTC, and subsequently proceeds to step S208. That is, when the subject vehicle M is traveling through the moving-object group at the lowest vehicle speed, it is desirable that the subject vehicle M advances forward as much as possible within a range in which the subject vehicle M does not come into contact with the obstacle. The travel_ECU 22 corrects the target objective distance Lt to a lower value (e.g., a value of about 10 cm to 20 cm from the obstacle toward the subject vehicle M) as the expectation value increases. Moreover, the travel_ECU 22 corrects the set threshold value Tth for the TTC to a lower value as the expectation value increases, so as to delay the timing for executing braking control.

When the travel_ECU 22 proceeds to step S208 from any one of step S204, step S205, and step S207, the travel_ECU 22 sets a target stopping position relative to the currently-recognized obstacle.

That is, in a case where the travel_ECU 22 proceeds to step S208 from either one of step S204 and step S205, the travel_ECU 22 sets the target stopping position to a position offset from the obstacle toward the subject vehicle M by the predetermined target objective distance Lt (e.g., 30 cm from the obstacle toward the subject vehicle M). In a case where the travel_ECU 22 proceeds to step S208 from step S207, the travel_ECU 22 sets the target stopping position to a position offset from the obstacle toward the subject vehicle M by the corrected target objective distance Lt (e.g., 10 cm to 20 cm from the obstacle toward the subject vehicle M).

When the travel_ECU 22 proceeds to step S209 from step S208, the travel_ECU 22 calculates a predicted time to collision TTC with respect to the obstacle, and checks whether the calculated predicted time to collision TTC is smaller than or equal to the set threshold value Tth.

Then, if the determination result obtained in step S209 indicates that the predicted time to collision TTC is larger than the threshold value Tth, the travel_ECU 22 exits the routine.

In contrast, if the determination result obtained in step S209 indicates that the predicted time to collision TTC is smaller than or equal to the threshold value Tth, the travel_ECU 22 proceeds to step S210 to execute braking control for the obstacle, and subsequently exits the routine.

That is, in step S210, the travel_ECU 22 calculates a target deceleration rate for stopping the subject vehicle M at the target stopping position based on the distance from the subject vehicle M to the target stopping position and a relative speed between the subject vehicle M and the obstacle. Then, the travel_ECU 22 suspends the ACC-based vehicle speed control and executes braking control using the target deceleration rate via the BK_ECU 25.

Figure 8:
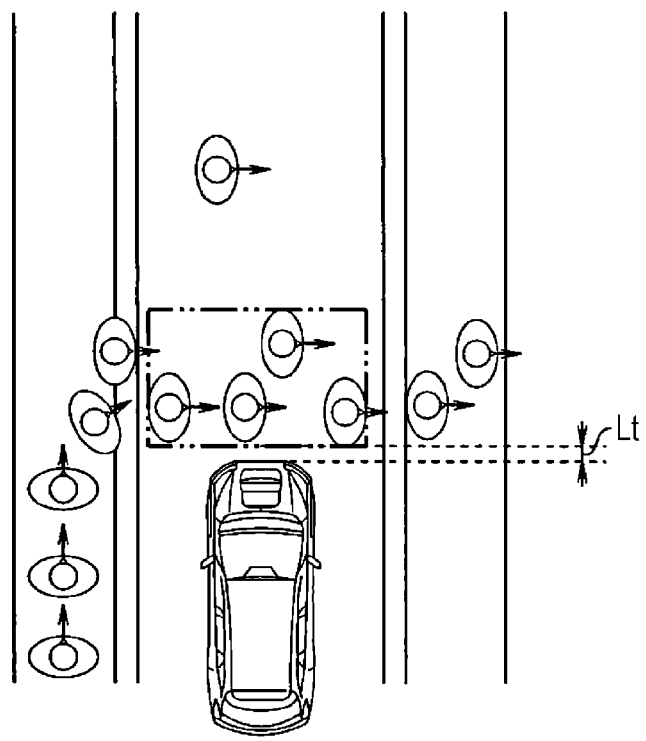
FIG. 8 illustrates a state where the subject vehicle makes an emergency stop before the moving-object group in accordance with emergency braking control.
Figure 13:
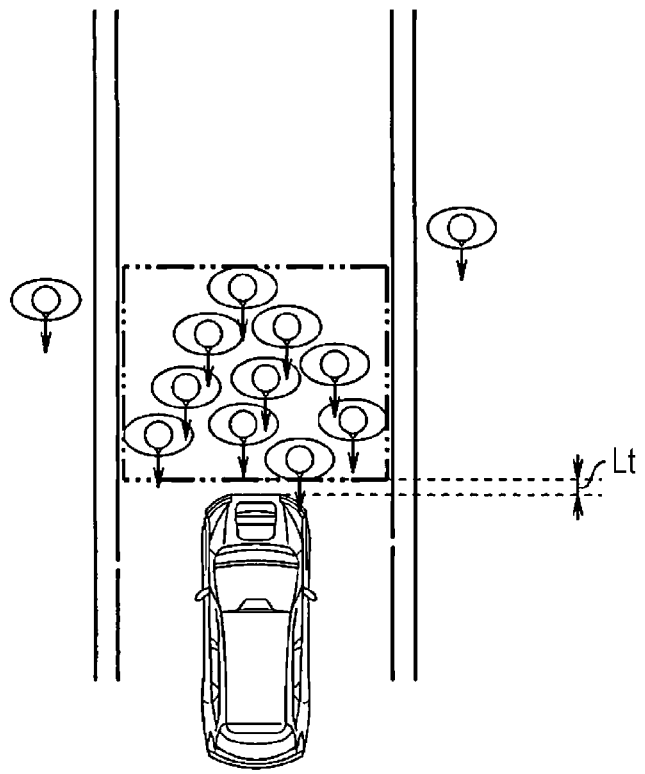
FIG. 13 illustrates a state where the subject vehicle makes an emergency stop before the moving-object group in accordance with emergency braking control.

Accordingly, for example, as illustrated in FIG. 8 and FIG. 13, if there is a moving-object group as an obstacle having a plurality of moving objects in front of the subject vehicle M, the subject vehicle M stops at a position offset from the moving-object group by the distance Lt.

Figure 5:
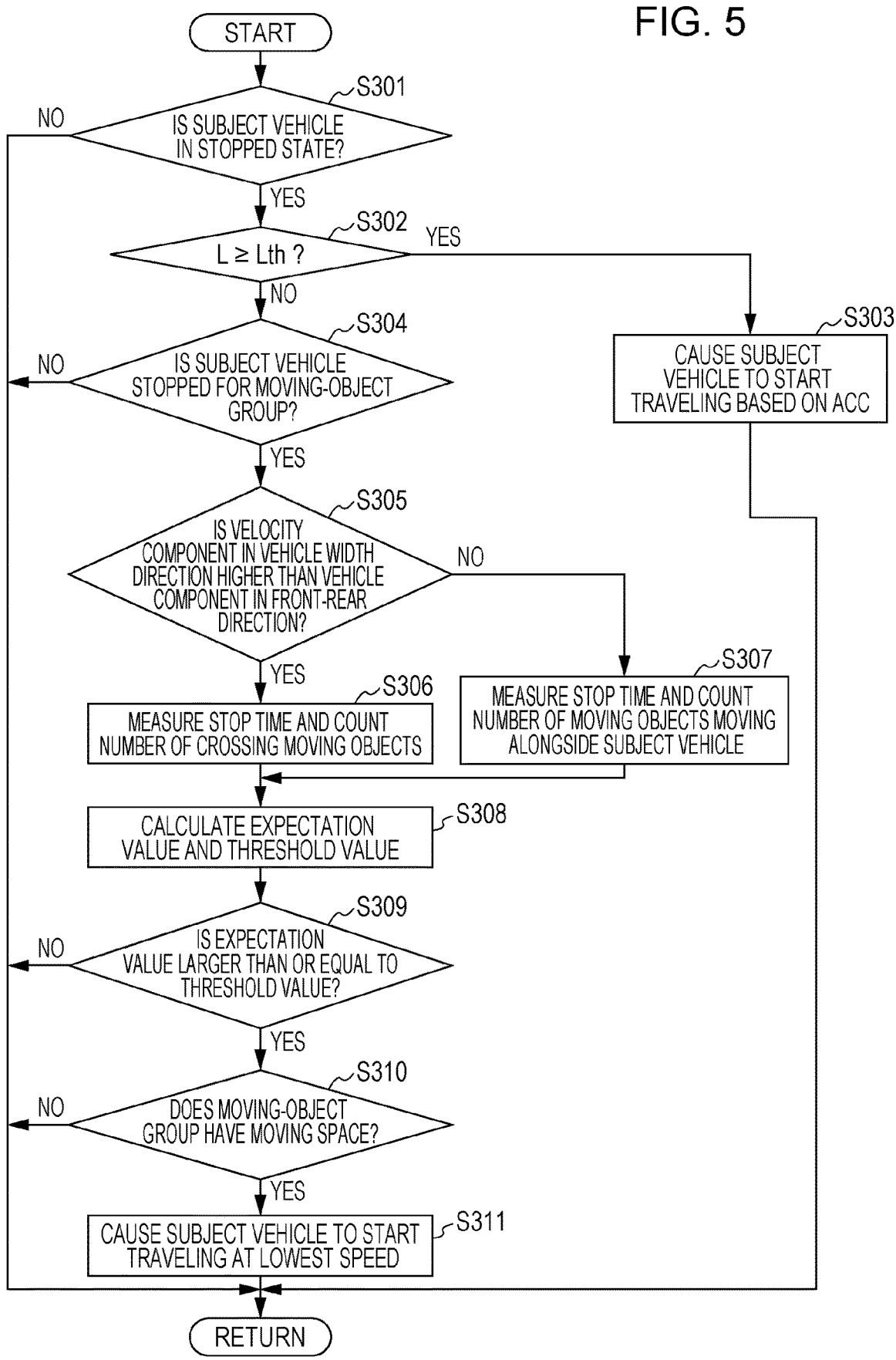
FIG. 5 is a flowchart illustrating a restart control routine after stopping due to emergency braking.

Next, the restart control after stopping due to emergency braking will be described with reference to a flowchart of a restart control routine illustrated in FIG. 5. This routine is to be executed repeatedly by the travel_ECU 22 for every set time period.

When the routine starts, the travel_ECU 22 checks in step S301 whether the subject vehicle M is currently in a stopped state.

If the subject vehicle M is not in a stopped state in step S301, that is, if the subject vehicle M is traveling, the travel_ECU 22 exits the routine.

In contrast, if the subject vehicle M is in a stopped state in step S301, the travel_ECU 22 proceeds to step S302 to check whether the objective distance L from the subject vehicle M to the obstacle is larger than or equal to the set threshold value Lth.

If the objective distance L is larger than or equal to the set threshold value Lth in step S302, the travel_ECU 22 proceeds to step S303 to cause the subject vehicle M to start traveling based on ACC, and exits the routine.

In contrast, if the objective distance L is smaller than the set threshold value Lth in step S302, the travel_ECU 22 proceeds to step S304 to check whether the subject vehicle M is currently stopped for a moving-object group as an obstacle.

If the determination result obtained in step S304 indicates that the subject vehicle M is not stopped for a moving-object group as an obstacle, that is, if the determination result indicates that the subject vehicle M is stopped for a three-dimensional object other than a moving-object group as an obstacle, the travel_ECU 22 exits the routine while maintaining the subject vehicle M in the stopped state.

In contrast, if the determination result obtained in step S304 indicates that the subject vehicle M is stopped for a moving-object group as an obstacle, the travel_ECU 22 proceeds to step S305 to check whether a velocity component of the moving-object group in the vehicle width direction with reference to the subject vehicle M is higher than a velocity component in the front-rear direction.

If the determination result obtained in step S305 indicates that the velocity component of the moving-object group in the vehicle width direction is higher than the velocity component in the front-rear direction, that is, if the determination result indicates that the moving-object group is moving in a direction for crossing the travel path of the subject vehicle M, the travel_ECU 22 proceeds to step S306. In step S306, the travel_ECU 22 measures the time elapsed from when the subject vehicle M has stopped, and also counts the number of moving objects, constituting the moving-object group, crossing in front of the subject vehicle M, and subsequently proceeds to step S308.

In contrast, if the determination result obtained in step S305 indicates that the velocity component of the moving-object group in the vehicle width direction is lower than or equal to the velocity component in the front-rear direction, that is, if the determination result indicates that the moving-object group is moving along the travel path of the subject vehicle M, the travel_ECU 22 proceeds to step S307. Then, in step S307, the travel_ECU 22 measures the time elapsed from when the subject vehicle M has stopped, and also counts the number of moving objects, constituting the moving-object group, moving alongside the subject vehicle M, and subsequently proceeds to step S308.

When the travel_ECU 22 proceeds to step S308 from either one of step S306 and step S307, the travel_ECU 22 calculates an expectation value that may allow the subject vehicle M to travel through the moving-object group as an obstacle, and also calculates a threshold value for the expectation value. Then, the travel_ECU 22 proceeds to step S309.

An expectation value is calculated by incorporating the stop time into the behavior of moving objects constituting a moving-object group. For example, if the moving-object group is moving in the direction for crossing the travel path of the subject vehicle M, a possibility in which the moving objects (such as pedestrians) constituting the moving-object group give way to the subject vehicle M may be expected to be higher, due to the pedestrians' psychological reasons, as the number of moving objects (such as pedestrians) constituting the moving-object group crossing in front of the subject vehicle M increases. Moreover, a possibility in which the moving objects (such as pedestrians) constituting the moving-object group give way to the subject vehicle M may be expected to be higher, due to the pedestrians' psychological reasons, as the time elapsed from when the subject vehicle M stops for the moving-object group becomes longer. The travel_ECU 22 refers to a preset map so as to calculate a higher expectation value with increasing number of moving objects crossing in front of the subject vehicle M and also to calculate a higher expectation value with increasing time elapsed from when the subject vehicle M stops.

Furthermore, for example, if the moving-object group is moving along the travel path of the subject vehicle M, a possibility in which the moving objects (such as pedestrians) constituting the moving-object group give way to the subject vehicle M may be expected to be higher, due to the pedestrians' psychological reasons, as the number of moving objects (such as pedestrians) constituting the moving-object group moving alongside the subject vehicle M increases. Moreover, a possibility in which the moving objects (such as pedestrians) constituting the moving-object group give way to the subject vehicle M may be expected to be higher, due to the pedestrians' psychological reasons, as the time elapsed from when the subject vehicle M stops for the moving-object group becomes longer. The travel_ECU 22 refers to the preset map so as to calculate a higher expectation value with increasing number of moving objects moving alongside the subject vehicle M and also to calculate a higher expectation value with increasing time elapsed from when the subject vehicle M stops.

Furthermore, for example, the travel_ECU 22 calculates a threshold value (i.e., set threshold value) for the expectation value based on the level of the moving-object group calculated in step S106 described above. In one example, the travel_ECU 22 refers to a preset map so as to calculate a higher threshold value for the expectation value with increasing level of the moving-object group. In detail, the travel_ECU 22 calculates a higher threshold value with increasing density of the moving-object group. Moreover, for example, if the barycenter of the moving-object group is approaching toward the subject vehicle M, the travel_ECU 22 calculates a higher threshold value, as compared with a case where the barycenter of the moving-object group is moving away from the subject vehicle M. Furthermore, the travel_ECU 22 calculates a higher threshold value with increasing degree of congestion in the area surrounding the subject vehicle M. Alternatively, the threshold value used may be a preset fixed value.

Subsequently, in step S309, the travel_ECU 22 checks whether the expectation value calculated in step S308 is larger than or equal to the threshold value.

Then, if the determination result obtained in step S309 indicates that the expectation value is smaller than the threshold value, the travel_ECU 22 exits the routine while maintaining the subject vehicle M in the stopped state.

In contrast, if the determination result obtained in step S309 indicates that the expectation value is larger than or equal to the threshold value, the travel_ECU 22 proceeds to step S310 to check whether the moving-object group has a moving space into which the subject vehicle M can advance.

If the determination result obtained in step S310 indicates that the moving-object group does not have a moving space, the travel_ECU 22 exits the routine while maintaining the subject vehicle M in the stopped state.

Figure 9:
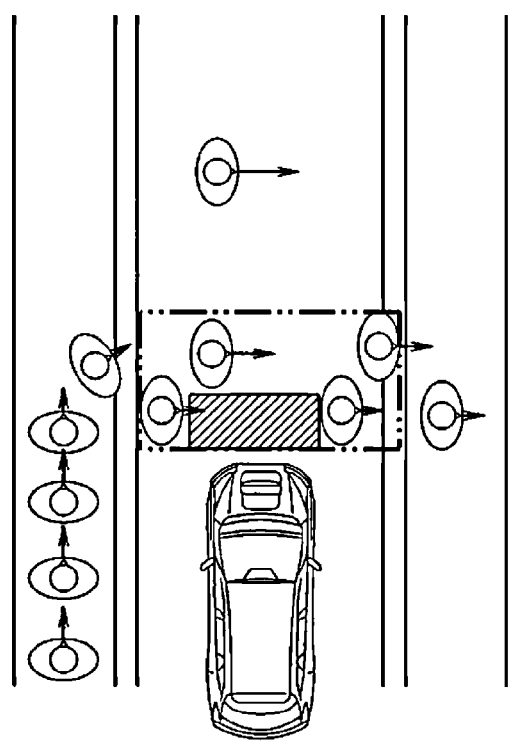
FIG. 9 illustrates a moving space formed in front of the subject vehicle.
Figure 10:
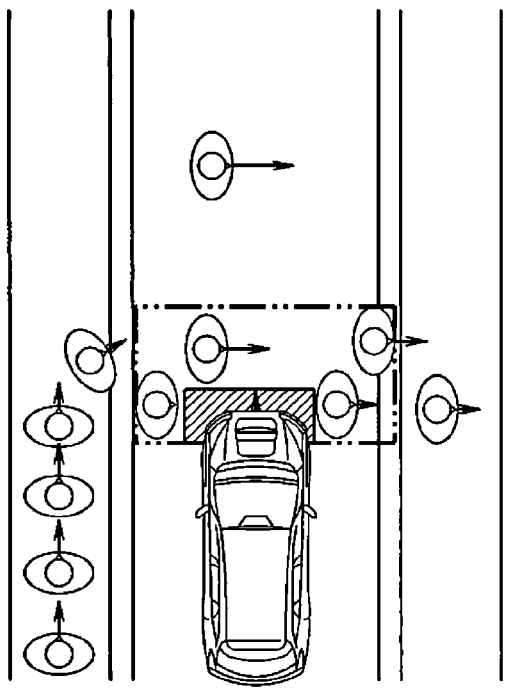
FIG. 10 illustrates a state where the subject vehicle is caused to start moving again to enter the moving space.
Figure 14:
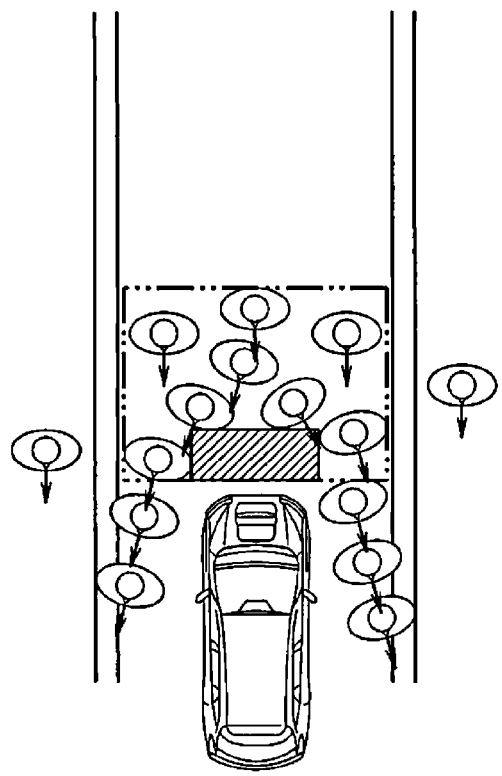
FIG. 14 illustrates a moving space formed in front of the subject vehicle.
Figure 15:
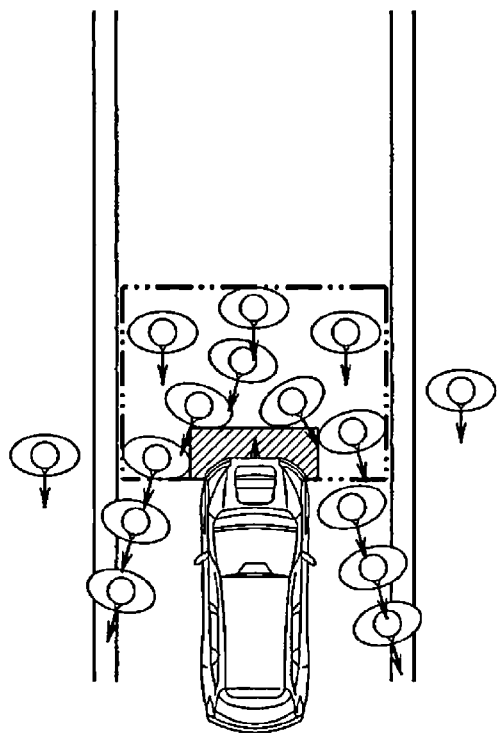
FIG. 15 illustrates a state where the subject vehicle is caused to start moving again to enter the moving space.

In contrast, if the determination result obtained in step S310 indicates that the moving-object group has a moving space (see a shaded area in each of FIG. 9 and FIG. 14), the travel_ECU 22 proceeds to step S311 to cause the subject vehicle M to start traveling at the lowest vehicle speed (e.g., creeping speed or lower) (see FIG. 10 and FIG. 15), and subsequently exits the routine. In the case where the subject vehicle M travels at the lowest vehicle speed relative to the moving-object group, the above-described emergency braking control involves performing step S206 and step S207 and stopping (i.e., re-stopping) the subject vehicle M, where appropriate, in accordance with the determination result obtained in step S209.

According to this embodiment, of three-dimensional objects recognized in front of the subject vehicle M based on travel environment information, the travel_ECU 22 recognizes a group of moving objects expressing preset similar behavior patterns as a moving-object group. In addition, the travel_ECU 22 comprehensively recognizes the moving-object group as an obstacle if the moving-object group is located closer to the subject vehicle M than other three-dimensional objects. When the subject vehicle M is stopped due to emergency braking for the moving-object group to be recognized as an obstacle, the travel_ECU 22 calculates an expectation value based on at least the behavior of each moving object constituting the moving-object group. When the expectation value becomes larger than or equal to a set threshold value, the travel_ECU 22 allows the subject vehicle M to start moving again even if the objective distance L is smaller than the set threshold value Lth, so that appropriate traveling can be ensured even when a plurality of pedestrians are successively recognized in front of the subject vehicle M, as in a congested downtown area.

That is, a plurality of moving objects expressing similar behaviors are comprehensively recognized as a moving-object group, so that the behavior of each pedestrian can be readily recognized in the emergency braking control, thereby achieving improved controllability. In addition, even in a case where the subject vehicle M cannot ensure a safe distance (Lth) relative to the moving-object group recognized as an obstacle, the subject vehicle M is allowed to start moving again toward the moving-object group if the expectation value is larger than or equal to the threshold value after the subject vehicle M makes an emergency stop. Consequently, even when a plurality of pedestrians are successively recognized in front of the subject vehicle M, the subject vehicle M can appropriately travel to pass through the congested downtown area.

In this case, the travel_ECU 22 causes the subject vehicle M to travel at the lowest vehicle speed, so that the subject vehicle M can accurately advance toward the moving-object group while ensuring safety.

In the above-described embodiment, the travel-environment recognition unit 11, the locator unit 12, the travel_ECU 22, the E/G_ECU 23, the PS_ECU 24, the BK_ECU 25, and the road-map-information-integration_ECU 101 are each constituted of, for example, a known microcomputer including a central processing unit (CPU), a random access memory (RAM), a read only memory (ROM), and a non-volatile storage unit, and peripheral devices thereof. A program to be executed by the CPU and fixed data, such as a data table, are preliminarily stored in the ROM. The functions of each processor may entirely or partially be constituted of either one of a logic circuit and an analog circuit, and the process of each of the various kinds of programs may be realized by an electronic circuit, such as a field programmable gate array (FPGA).

The above embodiment of the disclosure is not limited thereto and permits other various modifications so long as they do not depart from the scope of the disclosure in the practical phase. For example, even when some elements are deleted from all the elements indicated in the above-described embodiment, if the problems to be solved by the disclosure can be solved and the advantageous effects of the disclosure can be achieved, the configuration with these deleted elements may be extracted as an embodiment of the disclosure.

The travel control device 10 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the travel control device 10 including the travel-environment recognition unit 11, the locator unit 12, the travel_ECU 22, the E/G_ECU 23, the PS_ECU 24, the BK_ECU 25, the throttle actuator 27, the electric power-steering motor 28, and the brake actuator 29. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle travel control device to be applied to a vehicle, the vehicle travel control device comprising:
   a travel environment recognizer configured to recognize travel environment information including road information and traffic information around the vehicle;
   an obstacle recognizer configured to
      recognize three-dimensional objects recognized in front of the vehicle based on the travel environment information;
      recognize, as a moving-object group, a group of moving objects expressing preset similar behavior patterns among the three-dimensional objects; and
      recognize the moving-object group as an obstacle if the moving-object group is located at a position closer to the vehicle than to other three-dimensional objects other than the moving-object group among the three-dimensional objects; and
   a travel controller configured to perform emergency braking for avoiding a collision with the obstacle when a first parameter indicating a relative relationship between the vehicle and the obstacle becomes smaller than or equal to a first set threshold value, and cause the vehicle to start moving again when a second parameter becomes larger than or equal to a second set threshold value that is different from the first set threshold value, the second parameter indicating a relative relationship between the vehicle and the obstacle after the vehicle is stopped in accordance with the emergency braking,
wherein the travel controller is configured to calculate an expectation value based on at least a behavior of each moving object constituting the moving-object group when the vehicle is stopped in accordance with the emergency braking for the moving-object group as the obstacle, and allow the vehicle to start moving again when the expectation value becomes larger than or equal to a set threshold value even if the second parameter is smaller than the second set threshold value,
wherein the travel controller is configured to calculate a predicted time to collision with respect to the obstacle as the first parameter,
wherein the second parameter is a distance between the vehicle and the obstacle, and
wherein the travel controller is configured to:
  count a number of the three-dimensional objects crossing in front of the vehicle after the vehicle is stopped in accordance with the emergency braking; and
  calculate the expectation value such that (1) the expectation value becomes larger as an elapsed time after the vehicle is stopped in accordance with the emergency braking increases, and (2) the expectation value becomes larger as the counted number of the three-dimensional objects becomes larger.

2. The vehicle travel control device according to claim 1, wherein the travel controller is configured to allow the vehicle to start moving again under a condition that a moving space is formed in the moving-object group when the expectation value becomes larger than or equal to the set threshold value.

3. The vehicle travel control device according to claim 1, wherein the travel controller is configured to cause the vehicle to travel at a lowest vehicle speed when the travel controller allows the vehicle to start moving again.

4. The vehicle travel control device according to claim 2, wherein the travel controller is configured to cause the vehicle to travel at a lowest vehicle speed when the travel controller allows the vehicle to start moving again.

5. The vehicle travel control device according to claim 1, wherein the travel controller is configured to calculate the set threshold value such that the set threshold value becomes higher as a density of the moving-object group increases.

6. A vehicle travel control device to be applied to a vehicle, the vehicle travel control device comprising:
  a travel environment recognizer configured to recognize travel environment information including road information and traffic information around the vehicle;
  an obstacle recognizer configured to
    recognize three-dimensional objects recognized in front of the vehicle based on the travel environment information;
    recognize, as a moving-object group, a group of moving objects expressing preset similar behavior patterns among the three-dimensional objects; and
    recognize the moving-object group as an obstacle if the moving-object group is located at a position closer to the vehicle than to other three-dimensional objects other than the moving-object group among the three-dimensional objects; and
  a travel controller configured to perform emergency braking for avoiding a collision with the obstacle when a first parameter indicating a relative relationship between the vehicle and the obstacle becomes smaller than or equal to a first set threshold value, and cause the vehicle to start moving again when a second parameter becomes larger than or equal to a second set threshold value that is different from the first set threshold value, the second parameter indicating a relative relationship between the vehicle and the obstacle after the vehicle is stopped in accordance with the emergency braking,
wherein the travel controller is configured to calculate an expectation value based on at least a behavior of each moving object constituting the moving-object group when the vehicle is stopped in accordance with the emergency braking for the moving-object group as the obstacle. and allow the vehicle to start moving again when the expectation value becomes larger than or equal to a set threshold value even if the second parameter is smaller than the second set threshold value,
wherein the travel controller is configured to calculate a predicted time to collision with respect to the obstacle as the first parameter,
wherein the second parameter is a distance between the vehicle and the obstacle, and
wherein the travel controller is configured to:
  count a number of the three-dimensional objects moving alongside of the vehicle after the vehicle is stopped in accordance with the emergency braking; and
  calculate the expectation value such that (1) the expectation value becomes larger as an elapsed time after the vehicle is stopped in accordance with the emergency braking increases, and (2) the expectation value becomes larger as the counted number of the three-dimensional objects becomes larger.

7. The vehicle travel control device according to claim 6, wherein the travel controller is configured to calculate the set threshold value such that the set threshold value becomes higher as a density of the moving-object group increases.

8. The vehicle travel control device according to claim 6, wherein the travel controller is configured to allow the vehicle to start moving again under a condition that a moving space is formed in the moving-object group when the expectation value becomes larger than or equal to the set threshold value.

9. The vehicle travel control device according to claim 6, wherein the travel controller is configured to cause the vehicle to travel at a lowest vehicle speed when the travel controller allows the vehicle to start moving again.

10. The vehicle travel control device according to claim 8, wherein the travel controller is configured to cause the vehicle to travel at a lowest vehicle speed when the travel controller allows the vehicle to start moving again.

11. A vehicle travel control device to be applied to a vehicle, the vehicle travel control device comprising:
  circuitry configured to:
    recognize travel environment information including traffic information around the vehicle;
    determine, based on the recognized travel environment information, a moving-object group exists in front of the vehicle, the moving-object group comprising a group of moving objects expressing preset similar behavior patterns;
    in response to determining that the moving-object group exists in front of the vehicle, perform a stop control to stop the vehicle at a position that is distant from a first moving object by a target distance when a time to collision with respect to the first moving object is smaller or equal to a first threshold value, the first moving object being closest to the vehicle among the moving objects in the moving-object group;

during performing the stop control, determine whether a distance between the first moving object and the vehicle is larger than or equal to a second threshold value;

in response to determining that the distance between the first moving object and the vehicle is larger than or equal to the second threshold value, perform a first restart control to start the vehicle moving forward at a first vehicle speed;

in response to determining that the distance between the first moving object and the vehicle is not larger than or equal to the second threshold value, (1) calculate an expectation value based on a behavior of the moving objects in the moving-object group, and (2) determine whether the calculated expectation value is larger than or equal to a third threshold value;

in response to determining that the calculated expectation value is larger than or equal to the third threshold value, perform a second restart control to start the vehicle moving forward at a second vehicle speed lower than the first vehicle speed; and in response to determining that the calculated expectation value is not larger than or equal to the third threshold value, maintain performing of the stop control, wherein the circuitry is configured to calculate the expectation value such that the expectation value becomes larger as an elapsed time after the performing of the stop control is started increases, and wherein the circuitry is configured to:

count a number of the moving objects crossing in front of the vehicle after the performing of the stop control is started; and calculate the expectation value such that the expectation value becomes larger as the counted number of the moving objects becomes larger.

12. The vehicle travel control device according to claim 11, wherein the circuitry is configured to:

count a number of the moving objects moving alongside of the vehicle after the performing of the stop control is started; and calculate the expectation value such that the expectation value becomes larger as the counted number of the moving objects becomes larger.

13. The vehicle travel control device according to claim 11, wherein the circuitry is configured to set the second vehicle speed to a lowest vehicle speed.

14. The vehicle travel control device according to claim 13, wherein the circuitry is configured to, in response to performing the second restart control to start the vehicle moving forward at the second vehicle speed lower than the first vehicle speed, calculate the first threshold value such that the first threshold value becomes smaller as the expectation value becomes larger.

15. The vehicle travel control device according to claim 14, wherein the circuitry is configured to calculate the target distance such that the target distance becomes smaller as the expectation value becomes larger in addition to calculating the first threshold value such that the first threshold value becomes smaller as the expectation value becomes larger.

* * * * *